(12) United States Patent
Bonaquist et al.

(10) Patent No.: US 6,406,518 B1
(45) Date of Patent: Jun. 18, 2002

(54) GAS SEPARATION PROCESS USING CERAMIC MEMBRANE AND REGENERATORS

(75) Inventors: Dante Patrick Bonaquist, Grand Island; John Fredric Billingham, Getzville; Joseph Michael Schwartz, Amherst; Ravi Prasad, East Amherst, all of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/641,981

(22) Filed: Aug. 21, 2000

(51) Int. Cl.$^7$ ............................................. B01D 53/22
(52) U.S. Cl. ..................... 95/54; 95/45; 96/4
(58) Field of Search ................ 95/45, 54; 96/4, 96/7, 11

(56) References Cited

U.S. PATENT DOCUMENTS

| | | | |
|---|---|---|---|
| 2,671,324 A | 3/1954 | Trumpler | 62/175.5 |
| 5,035,727 A | 7/1991 | Chen | 55/16 |
| 5,169,415 A * | 12/1992 | Roettger et al. | 95/54 |
| 5,174,866 A | 12/1992 | Chen et al. | 204/59 |
| 5,342,431 A | 8/1994 | Anderson et al. | 95/45 |
| 5,562,754 A * | 10/1996 | Kang et al. | 95/54 |
| 5,648,304 A | 7/1997 | Mazanec et al. | 501/134 |
| 5,702,999 A | 12/1997 | Mazanec et al. | 501/152 |
| 5,712,220 A | 1/1998 | Carolan et al. | 502/400 |
| 5,733,069 A | 3/1998 | Schofield, Jr. | 405/259.1 |
| 5,733,435 A | 3/1998 | Prasad et al. | 205/765 |
| 5,797,997 A | 8/1998 | Noreen | 136/253 |
| 5,825,925 A | 10/1998 | Baird et al. | 382/225 |
| 5,964,922 A * | 10/1999 | Keskar et al. | 95/54 X |
| 6,117,210 A * | 9/2000 | Prasad et al. | 95/54 |
| 6,139,604 A * | 10/2000 | Gottzmann et al. | 95/54 |
| 6,149,714 A * | 11/2000 | Kobayashi | 95/54 |
| 6,214,066 B1 * | 4/2001 | Nataraj et al. | 95/54 X |

FOREIGN PATENT DOCUMENTS

EP            658366           6/1995

OTHER PUBLICATIONS

Lankford, Jr. et al, "The Making, Shaping and Treating of Steel" 10$^{th}$ Edition, US Steel, AISE (1985) pp. 557–585.

* cited by examiner

Primary Examiner—Robert H. Spitzer
(74) Attorney, Agent, or Firm—David M. Rosenblum (57) ABSTRACT

A process (and corresponding system) for separating a high purity gas (e.g. oxygen) from a feed gas stream (e.g. air) that includes heating the feed gas stream before passing the heated feed gas stream through a ceramic membrane to separate a gas component from the other components of the gas stream.

18 Claims, 3 Drawing Sheets

GAS SEPARATION PROCESS USING CERAMIC MEMBRANE AND REGENERATORS

FIELD OF THE INVENTION

The present invention relates to a system and corresponding process for separating a gaseous component from a gas mixture employing a combination of at least one regenerator and at least one ceramic membrane to produce a high purity gaseous component stream. In particular, one preferred embodiment of this invention relates to an energy efficient, cost effective process for producing a high purity oxygen stream from an air stream or from a high purity nitrogen or argon gas stream that contains an oxygen impurity.

BACKGROUND OF THE INVENTION

The separation of oxygen from an oxygen-containing gaseous stream is a process step in a number of commercially significant manufacturing operations. One method of oxygen separation utilizes a mixed conductor ceramic membrane material (also sometimes referred to as an "oxygen ion transport membrane" or "(OTM)" or an "ionic/mixed conductor membrane unit"). Oxygen ions and electrons are selectively transported through this non-porous ceramic membrane material that is impervious to other species.

Suitable ceramics include mixed conductor perovskites and dual phase metal-metal oxide combinations. Exemplary ceramic compositions are disclosed in U.S. Pat. No. 5,342,431 (Anderson et al.); U.S. Pat. No. 5,648,304 (Mazanec et al.); U.S. Pat. No. 5,702,999 (Mazanec et al.); U.S. Pat. No. 5,712,220 (Carolan et al.); and U.S. Pat. No. 5,733,435 (Prasad et al.). All of these references are incorporated herein by reference in their entireties.

Ceramic membranes formed from solid electrolytes and mixed conducting oxides typically exhibit the property of oxygen selectivity. "Oxygen selectivity" means that only oxygen ions are transported across the membrane with the exclusion of other elements and ions. Particular advantageous solid electrolyte ceramic membranes are made from inorganic oxides, typically containing calcium- or yttrium-stabilized zirconium or analogous oxides having a fluorite or perovskite structure. Use of such membranes in gas purification applications is described in U.S. Pat. No. 5,733,069 entitled "Reactive Purge For Solid Electrolyte Membrane Gas Separation" by Prasad et al., which is also incorporated herein by reference in its entirety.

Ceramic membrane materials have the ability to transport oxygen ions and electrons at the prevailing oxygen partial pressure in a temperature range of from 450° C. to about 1200° C. when a chemical potential difference is maintained across the membrane element. This chemical potential difference is established by maintaining a positive ratio of oxygen partial pressures or an electrical gradient across the ion transport membrane. The oxygen partial pressure ($P_{o2}$) or electrical gradient is maintained at a higher value on the cathode side of the membrane, that side exposed to the oxygen-containing gas, than on the anode side, where the transported oxygen is recovered or used.

Ceramic membranes used in air separation for the production of high purity oxygen require the feed air to be raised to an elevated temperature (800° C. to 1000° C.) before being introduced into a membrane unit.

A number of existing systems for air separation using ceramic membranes heated the feed air to the operating temperature of the membrane by combustion. Typically, a fuel gas was mixed with the feed air and the mixture was burned. The heat of combustion is sufficient to raise the temperature of the entire air stream. Alternatively, heat transfer surface areas within the ceramic membrane unit itself have been used, or separate heat exchangers used, to heat the feed air stream by recovering energy from the streams leaving the membrane unit or an associated gas turbine unit.

The use of combustion to heat the feed air has several disadvantages. First, a portion of the oxygen in the feed air is consumed, thus reducing the partial pressure driving force for the membrane unit. Second, combustion adds undesirably $CO_2$ and water vapor into the feed air stream. Third, some means of recovering thermal and pressure energy from the hot waste nitrogen stream must be included in the process. The flow rate of the waste nitrogen stream is about 85% of that of the original feed air. Although it would seem to be a simple matter to expand the hot waste nitrogen in a gas turbine, the operating temperature of the ceramic membrane unit and therefore the temperature of the hot waste gas is above practical limits for such turbines.

The use of a heat transfer surface area within the membrane to heat the feed gas also has disadvantages. For example, it greatly increases the cost of the membrane construction and operation and for most commercial applications is prohibitively too expensive. Also, the use of conventional heat exchangers is generally too expensive if the goal is to raise the temperatures of the feed gas more than about 200–300° C. because of the inherent relatively poor heat transfer in such equipment. This extra cost can increase greatly when very high temperatures are required because of the need for exotic materials of construction to withstand the combination of pressure and intense heat.

Specific examples of prior art systems for heating the feed air stream to a membrane system are described in the following references:

European Patent Application No. 658,366 (Kang et al.) describes a method for the recovery of oxygen from air in which a high temperature ion transport membrane system is integrated with a combustion turbine system. Coproduction of oxygen and electric power is achieved in one embodiment by integrating a power generation system with an ion transport membrane system. The design performance of the gas turbine in the power generation system is maintained by controlled water injection into the membrane non-permeate stream which is introduced into the gas turbine combustor. Alternatively, makeup air is added to the membrane feed to maintain the performance of the gas turbine. $NO_x$ formation is reduced by introducing the oxygen-depleted non-permeate from the membrane system to the gas turbine combustor. While this published European patent application employs heat exchangers and water injection for temperature control, it does not mention the use of regenerators for temperature control.

U.S. Pat. No. 5,035,727 (Chen) describes a process for recovering oxygen from an externally-fired power generating gas turbine system in which a hot compressed air stream is first passed over the feed side of a solid electrolyte oxygen selective membrane while a positive oxygen ionic potential is maintained on the membrane to separate oxygen from the stream. The oxygen is removed from the permeate side of the membrane and the waste gas stream is expanded through the turbine expander to generate power. The patent teaches the use of heat exchangers to control the temperature of the process streams. The patent does not mention the use of regenerators to control temperature.

U.S. Pat. No. 5,174,866 (Chen et al.) teaches a process for extracting high purity oxygen from the exhaust stream of a gas turbine generator by passing the turbine exhaust over the feed side of a solid electrolyte membrane selective to the permeation of oxygen, separating the oxygen from the exhaust stream. The oxygen product stream is then removed from the permeate side of the membrane. The reject exhaust stream is then passed through a power generating turbine to recover net power. This patent employs heat exchangers in the system instead of regenerators.

U.S. Pat. No. 5,797,997 (Noreen) describes a thermophotovoltaic (TPV) system that converts air/fuel mixtures into oxygen and electricity for use in a variety of applications. The TPV system efficiently generates oxygen and electric power through the combustion of fossil fuels in air with little or no nitrogen oxides or other undesirable combustion by-products. Combustion temperatures are kept at about 1700° C. or lower while burning a reactant having an air/fuel ratio of greater than about 3:1. Heat from combustion products can be recycled and recovered without concern for excessive increases in combustion temperature and subsequent combustor/emitter degradation. The generated oxygen may be harvested for commercial use as well as for introduction back into the TPV system. An insulated housing containing a porous ceramic matrix is used having a combustion zone for supporting combustion of a reactant mixture and for emitting radiant energy in response to the combustion. A heat recovery system is used to recover the heat of combustion and for preheating the reactant mixture. A means is provided for transferring the generated electricity to the membrane for separating the oxygen. The heat recovery system is integrated with the porous ceramic membrane. This patent does not use separate regenerators for preheating and heat recovery in the system.

U.S. Pat. No. 5,852,925 (Prasad et al.) teaches a method of producing oxygen and generating power where (1) a compressed oxygen-containing gas stream is first heated in a heat-exchanger to preheat the gas stream to about 300° C. to about 800° C., then enters a combustor, where it is combusted with fuel. The combusted, compressed gas stream is then contacted with a solid electrolyte membrane to produce an oxygen-depleted, compressed gas stream and pure oxygen stream. The oxygen-depleted gas stream is further combusted and then expanded in a gas turbine to produce power. The patent does not mention the use of regenerators to control temperature.

The proposed invention addresses the problems of prior art processes where combustion was used to heat the feed gas to the membrane or where a heat transfer surface area is built into the membrane or where conventional heat exchangers are employed.

Separately, regenerators have been used in the steel and cryogenic air separation industry. Examples of prior regenerator applications include the following:

"The Making, Shaping and Treating of Steel", 10$^{th}$ Edition, US Steel, AISE, pp. 557–585, discusses the use of regenerators operating at high temperature to preheat the blast air for use in steel-making blast furnaces.

U.S. Pat. No. 2,671,324 (Trumpler) teaches the use of regenerators in a cryogenic air separator plant.

These prior art applications of regenerators do not contemplate or suggest their use with selective ceramic membranes of any type.

SUMMARY OF THE INVENTION

Therefore, one aspect of the present invention is directed to a system for separating a high purity gaseous component from a gaseous mixture, comprising:

a feed gas stream comprising the gaseous mixture;

at least one regenerator capable of heating at least a portion of the feed gas stream, and at least one selective ceramic membrane capable of separating a gaseous component from the gaseous mixture in the heated feed gas stream and thereby forming a high purity gaseous component.

Another aspect of the present invention is directed to a process for separating a high purity gaseous component from a gaseous mixture, comprising:

passing at least a portion of a feed gas stream containing the gaseous mixture through at least one regenerator to form a heated feed gas stream; and passing the heated feed gas stream through at least one selective ceramic membrane to separate a gaseous component from the heated feed gas stream; thereby forming a high purity gaseous component and a waste gas stream.

One preferred embodiment of the present inventive system and process is the separation of a high purity oxygen stream from an air stream using the combination of at least one regenerator to heat the air stream followed by passing the heated air stream through a mixed conductor ceramic membrane to separate the oxygen from other gaseous components of the air stream.

Another preferred embodiment of the instant invention uses regenerators followed by an optional heating means to further raise the feed air temperature to the desired level for a mixed conductor ceramic membrane. The optional heating means includes either combustion of the heated gas stream with a fuel gas such as natural gas or combustion of the feed gas stream with a carbon monoxide-hydrogen mixture (syngas) or by electrical heating.

Electrical heating is preferred since no combustion takes place, thus the partial pressure driving force for the membrane is not reduced and no combustion by-products are introduced to the feed air stream.

In still another preferred embodiment, the thermal energy of the hot waste gas is recovered by using it to preheat the feed air stream. This is accomplished by using the hot waste gas to heat the ballast material contained in a regenerator before the feed air is permitted to pass through the regenerator. The pressure energy and any remaining thermal energy of the waste nitrogen stream is recovered by expanding it using a conventional hot gas expander downstream of the regenerator.

DETAILED DESCRIPTION

The term "feed gas stream" as used in the present specification and claims refers to any feed gas stream which contains a gaseous component that may be separated from that feed gas stream by passing the feed gas stream through a ceramic membrane that selectively passes ions of that particular gaseous component through the membrane without allowing the other gaseous components to pass through the ceramic membrane. The preferred feed gas stream is air and the preferred gaseous component to be selectively separated is oxygen. Other suitable feed gas streams include high purity nitrogen or argon streams that contain small amounts of oxygen impurities (e.g. about 0.001% to about 20% by volume). In this latter embodiment, a high purity (i.e. low oxygen) nitrogen or argon stream is obtained on the retentate or cathode side of the membrane. The permeate or anode side of the membrane, into which the separated oxygen from the feed stream passes, may be purged with a sweep gas such as steam to maintain a low partial pressure of oxygen. Alternatively, fuel may be added to the permeate side and the oxygen combusted to effectively maintain the oxygen concentration at zero.

The term "regenerator" as used in the present specification and claims refers to any regenerator construction that can store and release sufficient amount of thermal energy in an alternating cycle to sufficiently heat the feed air stream of a selective ceramic membrane. One preferred single pass regenerator design allows the feed air stream to flow up while allowing a high pressure waste gas stream to alternatively flow down. For a 250 ton per day oxygen plant, this preferred regenerator has a cylindrical body with an 8 to 10 feet internal diameter and is 8 to 20 feet tall. This preferred regenerator contains a sufficient amount of heat transfer material to store thermal energy to heat the feed air stream. The preferred heat transfer material is ceramic packing in various ball-like sizes. These sizes may vary from 0.125 inch to 1 inch diameters. Preferably, the bed has a 4 foot bed of 0.125 inch packing below a 10 foot bed of 0.25 inch packing in the main cylinder area of the regenerator. The heads or ends of the regenerator cylinder may be filled with a layer of packing balls having either one inch or 0.5 inch diameters for the purpose of flow distribution.

The regenerators of the present invention preferably operate isobarically. That is, the pressure that operates at one stroke of the cycle (e.g. the heating of the feed gas stream as it passes upward through the regenerator) is the same pressure as that of the alternative stroke of the cycle (e.g. the cooling of the waste gas stream as it passes downward through the regenerator), and differs only by the small pressure drop in the piping and equipment. Thus, there is essentially no blow down with its attendant thermal loss between cycles.

The regenerators of the present invention may advantageously require no cleaning or purification of the feed gas stream or the waste gas stream. Furthermore, the regenerators used in the instant invention may operate with an uniform flow throughout the full length of the regenerator. Still another advantage of the present invention is that the regenerators can be integrated with selective ceramic membrane without extensive piping or valving.

The term "selective ceramic membrane" as used in the present specification and claims refers to any ceramic membrane that allows one gas to selectively permeate through the membrane and thus, be separated from the remaining components of gas mixture. The preferred type of selective ceramic membrane is a mixed conductor ceramic membrane which is used to selectively separate oxygen from other gases.

The term "mixed conductor ceramic membrane" as used in the present specification and claims refers to any ceramic membrane structure or any ionic/mixed conductor membrane structure or any equivalent membrane structure that converts an impure oxygen-containing gas stream (e.g. air) into an oxygen permeate gas stream. The oxygen permeate gas stream typically comprises pure oxygen or a high purity oxygen defined as a gas generally containing at least about 95 volume % $O_2$, more preferably more than about 99 volume % $O_2$.

Any mixed conductor ceramic membrane may be used with this invention. Mixed conductor perovskites and dual phase metal-metal oxide combinations disclosed in the references cited above may be particularly suitable. It is also preferable to use thin, strong membranes that have high oxygen flux, yet have sufficient tube strength to maintain an acceptable reliability. It is most preferred to have the purge gas stream flow through the inside of the tubes and air flow on the outside. This invention could also be practiced with tubes, flatplates, or other membrane structures. It may also be desirable for some applications to pack the tube with catalyst material or inert material to further improve the reaction between the oxygen permeate stream from the membrane with the purge gas stream or to simply improve mass transfer. While not preferred now, it may also be desirable for some applications to coat the membrane material with a porous coating or the like to increase its surface area or to improve its mass transfer capability. This invention may be used with any shaped membrane unit that could employ a reactive purge stream of the present invention. Such membrane units could include commercial deoxo and nitrogen production units.

Another embodiment that utilizes oxygen separation membranes are deoxo membrane units. These are used commercially to purify a gas stream that contains typically 1% to 2% by oxygen and a high percentage by volume argon and other inert gases. Thus, amounts of oxygen are removed from an oxygen-containing gas stream (i.e., a deoxo transfer) by passing a gas stream by the cathode side of a mixed conductor ceramic membrane in order to remove significant amounts of the oxygen therefrom. In addition, nitrogen production units are used commercially to produce a gas stream that is essentially all nitrogen and contains little or no oxygen. The impure nitrogen gas that contains too much oxygen (0.001–10%) is passed by the cathode side of the membrane to remove the significant portion of the oxygen therefrom. Accordingly, additional preferred embodiments of the present invention are directed toward using an impure argon or impure nitrogen gas stream or any gas stream that contains less than 20% by volume oxygen as the first oxygen source. In such cases, the resulting purified argon or nitrogen gas stream after passing by the cathode side of the membrane is useful itself.

The mixed conductor ceramic membrane may comprise any material that selectively conducts oxygen ions. The following table gives several examples of such materials.

TABLE I

Mixed Conducting Solid Electrolytes

Material Composition

1. $(La_{1-x}Sr_x)(Co_{1-y}Fe_y)O_{3-\delta}$
   ($0 \leq x \leq 1$, $0 \leq y \leq 1$, $\delta$ from stoichiometry)
2. $SrMnO_{3-\delta}$ ($\delta$ from stoichiometry)
   $SrMn_{1-y}Co_yO_{3-\delta}$ ($0 \leq y \leq 1$, $\delta$ from stoichiometry)
   $Sr_{1-x}Na_xMnO_{3-\delta}$ ($0 \leq x \leq 1$, $\delta$ from stoichiometry)
3. $BaFe_{0.5}Co_{0.5}YO_3$
   $SrCeO_3$
   $YBa_2Cu_3O_{7-\delta}$ ($0 \leq \delta \leq 1$, $\delta$ from stoichiometry)
4. $La_{0.2}Ba_{0.8}Co_{0.8}Fe_{0.2}O_{2.6}$; $Pr_{0.2}Ba_{0.8}Co_{0.8}Fe_{0.2}O_{2.6}$
5. $A_xA'_{x'}A''_{x''}B_yB'_{y'}B''_{y''}O_{3-\delta}$ (x, x', x", y, y', y" all in 0–1 range)

TABLE I-continued

Mixed Conducting Solid Electrolytes

Material Composition

| | | |
|---|---|---|
| Where: A, A', A" = | from groups 1, 2, 3 and f-block lanthanides | |
| B, B', B" = | from d-block transition metals | |
| | δ from stoichiometry | |
| 6. (a) Co—La—Bi type: | Cobalt oxide | 15–75 mole % |
| | Lanthanum oxide | 13–45 mole % |
| | Bismuth oxide | 17–50 mole % |
| (b) Co—Sr—Ce type: | Cobalt oxide | 15–40 mole % |
| | Strontium oxide | 40–55 mole % |
| | Cerium oxide | 15–40 mole % |
| (c) Co—Sr—Bi type: | Cobalt oxide | 10–40 mole % |
| | Strontium oxide | 5–50 mole % |
| | Bismuth oxide | 35–70 mole % |
| (d) Co—La—Ce type: | Cobalt oxide | 10–40 mole % |
| | Lanthanum oxide | 10–40 mole % |
| | Cerium oxide | 30–70 mole % |
| (e) Co—La—Sr—Bi type: | Cobalt oxide | 15–70 mole % |
| | Lanthanum oxide | 1–40 mole % |
| | Strontium oxide | 1–40 mole % |
| | Bismuth oxide | 25–50 mole % |
| (f) Co—La—Sr—Ce type: | Cobalt oxide | 10–40 mole % |
| | Lanthanum oxide | 1–35 mole % |
| | Strontium oxide | 1–35 mole % |
| | Cerium oxide | 30–70 mole % |

7. $Bi_{2-x-y}M'_xM_yO_{3-\delta}$ ($0 \leq x \leq 1$, $0 \leq y \leq 1$, δ from stoichiometry) where: M' = Er, Y, Tm, Yb, Tb, Lu, Nd, Sm, Dy, Sr, Hf, Th, Ta, Nb, Pb, Sn, In, Ca, Sr, La and mixtures thereof
   M = Mn Fe, Co, Ni, Cu and mixtures thereof
8. $BaCe_{1-x}Gd_xO_{3-x/2}$ where, x equals from zero to about 1.
9. One of the materials of $A_sA'_tB_uB'_vB''_wO_x$ family whose composition is disclosed in U.S. Pat. No. 5,306,411 (Mazanec et al.) as follows:
   A represents a lanthanide or Y, or a mixture thereof;
   A' represents an alkaline earth metal or a mixture thereof;
   B represents Fe;
   B' represents Cr or Ti, or a mixture thereof;
   B" represents Mn, Co, V, Ni or Cu, or a mixture thereof;
   and s, t, u, v, w, and x are numbers such that:
   s/t equals from about 0.01 to about 100;
   u equals from about 0.01 to about 1;
   v equals from zero to about 1;
   w equals from zero to about 1;
   x equals a number that satisfies the valences of the A, A', B, B', B" in the formula; and $0.9 < (s + t)/(u + v + w) < 1.1$
10. One of the materials of $La_{1-x}Sr_xCu_{1-y}M_yO_{3-\delta}$ family, where:
    M represents Fe or Co;
    x equals from zero to about 1;
    y equals from zero to about 1;
    δ equals a number that satisfies the valences of La, Sr, Cu, and M in the formula
11. One of the materials of $Ce_{1-x}A_xO_{3-\delta}$ family, where:
    A represents a lanthanide, Ru, or Y; or a mixture thereof;
    x equals from zero to about 1;
    δ equals a number that satisfies the valences of Ce and A in the formula
12. One of the materials of $Sr_{1-x}Bi_xFeO_{3-\delta}$ family, where:
    x equals from zero to about 1;
    δ equals a number that satisfies the valences of Sr, Bi, and FE in the formula
13. One of the materials of $Sr_xFe_yCo_zO_{3-\delta}$ family, where:
    x equals from zero to about 1;
    y equals from zero to about 1;
    z equals from zero to about 1;
    δ equals a number that satisfies the valences of Sr, Co and Fe in the formula
14. Dual phase mixed conductors (electronic/ionic):
    $(Pd)_{0.5}/(YSZ)_{0.5}$
    $(Pt)_{0.5}/(YSZ)_{0.5}$
    $(LaCr_{1-y}Mg_yO_{3-\delta})_{0.5}(YSZ)_{0.5}$, where
    y equals from 0 to about 1
    δ equals a number that satisfies the valences of La, Cr, and Mg in the formula
    $(In_{90\%}Pt_{10\%})_{0.5}/(YSZ)_{0.5}$
    $(In_{90\%}Pt_{10\%})_{0.5}/(YSZ)_{0.5}$
    $(In_{95\%}Pr_{2.5\%}Zr_{2.5\%})_{0.5}/(YSZ)_{0.5}$
    Any of the materials described in 1–13, to which a high temperature metallic phase (e.g, Pd, Pt, Ag, Au, Ti, Ta, W) is added The membrane operating parameters (e.g., temperature and pressure) of the present invention are similar to those conventionally used for membrane units in other oxygen purification processes. Suitable operating temperatures might include those from about 450° C. to about 1200° C. and suitable operating pressures might include those from about 15 to about 450 psia. The optimum temperatures and pressures will depend upon many factors including the particular membrane materials used as well as the amount of oxygen in the oxygen-containing source gas for the membrane. Also, the optimum operating conditions of the membrane may have to be adjusted in view of the type of purge gas used. It should be recognized that the overall optimum process conditions of the process of the present invention may depend upon the exact nature of the end-use applications of either or both the oxygen-depleted gas stream and the oxygen permeate. This may involve employing suboptimal conditions for either or both the membrane or the regenerator in order to achieve an overall optimum result.

For some applications, it may be desirable to add steam or some other oxygen-containing species to the anode side of the membrane to increase the oxygen activity of the purge stream so as to avoid compositional stresses within the membrane while still maintaining an oxygen activity gradient across the membrane to drive the oxygen ion transport through the membrane. Steam addition to the anode side may also be advantageous to reduce or eliminate undesirable carbon formation on surfaces in the vicinity of the anode side by keeping the temperatures in that reaction zone high enough to prevent carbon deposits.

Figure 1:
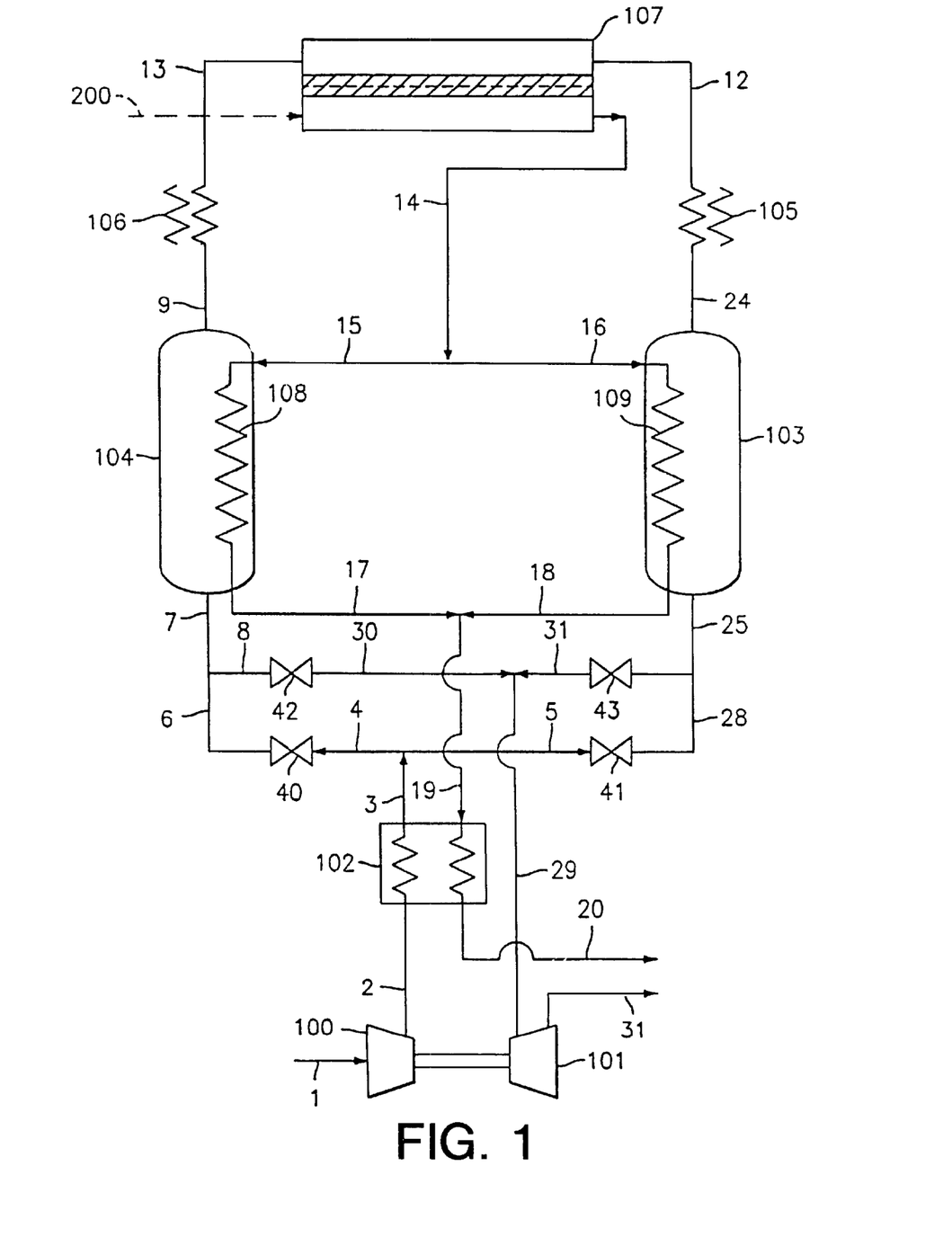
FIG. 1 is directed to a schematic representation of a combined regenerator/mixed conductor ceramic membrane system of the present invention.

FIG. 1 illustrates the one preferred embodiment of this invention. Ambient air 1 is compressed in compressor 100 to a pressure of approximately 200 psia. After exiting compressor 100, compressed air 2 enters oxygen heat exchanger 102 where it is warmed by cooling product oxygen stream 19. After the exit of oxygen heat exchanger 102, product oxygen stream 20 has been cooled to a temperature very close to that of entering air 2.

Warm compressed air 3 from oxygen heat exchanger 102 is directed to one of two regenerators, 103, by way of piping 5, valve 41 and pipings 28 and 25. The ballast material within regenerator 103 has previously been heated by passing hot waste nitrogen gas through it in a direction opposite to which the air is now flowing. Valve 41 is open while valve 40 is closed thus permitting warm air 3 to flow only through regenerator 103 and not regenerator 104. Upon leaving regenerator 103, the hot air stream 24, is typically within 100° C. of the operating temperature of mixed conductor ceramic membrane unit 107. Before entering the mixed conductor ceramic membrane unit 107, the hot air stream 24 may be further heated by any of a number of heating means 105. Such heating means 105 may include, but is not limited to, combustion of natural gas, combustion of a fuel mixture such as carbon monoxide and hydrogen or other fuel mixture, or electrically. The heating will be controlled by monitoring the temperature of the air at the effluent of heating means 105 and automatically controlling the flow of fuel.

Hot air effluent 12 exits from heating means 105 and enters mixed conductor ceramic membrane unit 107 at one end. The ceramic membrane may be of any configuration. The specific flow pattern within ceramic membrane unit 107 is not critical as the present innovation will work equally well with any design configuration. As the hot air flows through mixed conductor ceramic membrane unit 107, it becomes depleted in oxygen. Oxygen migrates from the inlet side through the ceramic membrane to the lower partial pressure region on the opposite side and exits at one end of ceramic membrane unit 107 as product oxygen stream 14. A desirable, but not necessary, option is to incorporate a purge gas stream, 200, at the end of ceramic membrane unit 107 opposite to oxygen product effluent stream in piping 14. This purge stream 200 will greatly enhance the flow of oxygen through the ceramic membrane. The product oxygen is transferred equally to piping 15 and 16 and then flows through passages within the regenerator such as coils of tubing, or channels built into the ballast material, 108 and 109, located within both regenerators, 103 and 104, simultaneously and continuously, in a direction opposite to that of the feed air. While flowing in the coils of tubing, the product oxygen stream is cooled. Upon exiting regenerators 103 and 104, in piping 17 and 18, the product oxygen streams are combined to form stream 19. Oxygen stream 19 is further cooled in oxygen heat exchanger 102 and exits in stream 20 as product oxygen at ambient temperature.

Oxygen-depleted gas, called hot nitrogen waste stream 13 exits ceramic membrane unit 107 as at the end opposite to where the hot air stream 12 was introduced into the membrane 107. Waste nitrogen stream 13 contains sufficient residual oxygen to support combustion. Upon entering heating means 106, hot waste nitrogen 13 is mixed with a small flow of fuel. The fuel reacts with residual oxygen in the waste nitrogen stream thereby raising the temperature of combusted waste stream 9 at the exit of heating means 106 above that of entering stream 13 by about 100 to 200° C. The temperature of effluent stream 9 is controlled by a temperature controller (not shown) which regulates the flow of fuel or electrical energy to heating means 106. Heating may be provided by any of a number of methods, combustion of any fuel or electrically.

Hot combusted waste nitrogen 9 enters regenerator 104. As it flows through regenerator 104, the hot nitrogen is cooled by heating the ballast material within regenerator 104. The ballast material within regenerator 104 has previously been cooled by passing air through it in the direction opposite to which the waste nitrogen is now flowing. The cooled combusted waste nitrogen then flows in piping 7 and 8 and then through valve 42 which is open while valve 43 is closed. This permits the waste nitrogen to flow through regenerator 104 and not regenerator 103. Significant thermal and pressure energy remain in stream in pipings 7 and 8. After passing through open valve 42, the cooled waste nitrogen stream is conducted through piping 30 and then to piping 29 which transfers it to turbo expander 101. This energy is recovered in turbo expander 101 which is preferably coupled to compressor 100 so that the energy recovered may be used directly by compressor 100. Alternatively, the turboexpander can be coupled to a generator or any energy absorbing system. Low pressure waste nitrogen gas is exhausted from expander 101 in stream 31 to the atmosphere.

After a period of time the flows in the regenerators are reversed by the operation of the valves 40, 41, 42 and 43 and piping 4, 5, 30 and 31, so that the continuous operation can be maintained. In this regard, warm compressed air flows into regenerator 104 by way of piping 4, valve 40 and pipings 6 and 7. The flow direction of the hot feed air to ceramic membrane unit 107 reverses at this time. The reversal of flow in the ceramic membrane unit is not necessary to the operation of this invention, however, it simplifies the piping and equipment in that with this arrangement no valves are required at the hot end of the equipment. No valve would be required at the air separation end (hot end) of the regenerator when the feed direction reverses with each cycle change. This is an important advantage from an operational standpoint as well as a cost standpoint. The operation of valves On a repetitive cycle in high temperature service poses a severe maintenance problem. It should be noted that there is only a limited blow down of the regenerators during a cycle change since the regenerators operate at essentially the same pressure on subsequent strokes.

This combination of regenerators 103 and 104 with optional heating means 105 and 106 is unique and not obvious from prior practice.

A novel method of heating the regenerators 103 and 104 was developed for the instant invention. Feed air is passed through one of the regenerators after having been preheated in the oxygen heat exchanger. After leaving the hot end of the regenerator it is boosted in temperature by a heating means to the temperature required for the separation of oxygen by the ceramic membrane. This heating means can be direct-fired combustion of a fuel in the feed gas stream, indirect heating by heat exchange with combustion of a fuel on the other side of the heat exchanger, or directly or indirectly by an electrical heater. The heating system is completed on the oxygen-depleted side of the ceramic membrane unit. This effluent gas is passed through an identical heating means before entering the hot end of the second regenerator. Again, this heating means can be a direct-fired heater, an indirect fired heater or an electrically heated unit. In the case of a combusted fuel, the oxygen for combustion can be obtained from the stream itself or separately from external air. Each heater, one on the feed side of the membrane, and one on the effluent side of the membrane, boosts the temperature of each stream by 100 to 200° C. After a period of time the flows are reversed in the two regenerators to maintain the proper operating temperatures within the system. With this unique system of combined regenerators and optional heating means, the regenerators can be initially brought up to operating temperature and then be maintained at the desired temperature for continued operation.

The regenerators used in this invention differ substantially from regenerators previously used in cryogenic service. In cryogenic service, the high pressure feed air is passed during the warm stroke and a low pressure waste stream is warmed during the cold stroke. The ratio of the pressure of the feed to the waste stream pressure is typically in the range 3–8 and more typically 5. This pressure difference has some significant drawbacks:

1) A significant amount of compressed air is lost during each regenerator switch. Extending the cycle times minimized this. However, this is detrimental to the heat transfer performance of the regenerator.
2) The regenerators will take several seconds, sometimes 10 to 1000 seconds, to repressurize. During this period there is no flow of feed to the process, which can have significant detrimental effects on the performance of downstream equipment.

3) The constant pressure cycling of the pressure vessel that forms the exterior of the regenerator imposes more stringent mechanical requirements, resulting in thicker and more expensive shells.

In the instant invention the regenerators preferably operate essentially isobarically. The ratio of the feed pressure to the waste pressure will typically be less than 1.1. Thus the drawbacks associated with regenerators in cryogenic service are not an issue in this service.

Regenerators in cryogenic service are typically also required to serve the function of removing condensable impurities in the feed air, primarily water and carbon dioxide. The waste stream then evaporates/sublimes the impurities and sweeps them out of the regenerator in readiness for the next feed pass. This self-cleaning mode of operation is contingent on very small temperature differences between the air and waste streams. It often requires balance passes within the regenerator where the flow is not constant throughout the regenerator. Failure to maintain self-cleaning operation will eventually result in the regenerator failing due to excessive pressure drop. The regenerators of the instant invention are not subject to such rigid constraints. Less than design performance may be accommodated by the addition of more heaters in the burners, either electrical or in the form of fuel. Combining the less stringent heat transfer requirements with the fact that both streams are at high pressure means that regenerators for the instant invention will be significantly smaller, typically less than half, than regenerators in cryogenic service for the same heat duty.

Finally, cryogenic regenerators must have valves at the cold end to direct the air to the column package. In one preferred embodiment of the instant invention, there are no valves at the hot end. This takes advantage of the fact that ceramic membranes can potentially be operated in either flow direction. This is a significant advantage since switching valves for hot service are very expensive and have a large potential for operational difficulties.

The actual design of the regenerator depends on the site. If height limitations are important smaller diameter pellets which afford high heat transfer area and high pressure drop may be used. This results in short, squat regenerators. If vessel diameter is the major concern, larger pellets can be used resulting in a taller, thinner regenerator construction.

As an example, a regenerator for the production of 250 tons per day of oxygen from a cycle corresponding to FIG. 1 could be 9 feet in diameter and have a 4 foot tall bed of 0.125 inch balls and a 10 foot tall bed of 0.25 inch balls on top. The smaller balls are located in the cooler region of the regenerator, where the gas density Is highest. Above and below the bed would be graded balls with a size range between 0.25 inch and 1 inch for the primary purpose of flow distribution. The weight of the balls in each regenerator is approximately 40 tons. An appropriate cycle time Is on the order of 3 minutes. However, the cycle time can be adjusted over a wide range depending on the actual system performance.

The high temperature operation will require special materials. The packing would consist of ceramic pellets. It is possible that a high chromium steel could be used for the regenerator vessels. It also may be desirable to incorporate a refractory lining for the regenerators. Initial estimates indicate substantial savings in both capital and operating costs when compared to a standard cryogenic oxygen plant. It is expected that the capital of a ceramic membrane-regenerator oxygen plant would require a capital expenditure of about one-third of that required for a standard cryogenic oxygen plant. A reduction of about 20 percent in operating costs would also favor the ceramic membrane-regenerator plant thus making the overall evaluation quite attractive.

Use of regenerators with the membrane should not be limited to $O_2$ production. Such an integration has applicability for wide-ranging gas products and power production.

In another embodiment of the present invention, one or more of regenerators may be equipped with a catalyst bed at its hot end. This may be used to promote the reaction of any fuel and any residual oxygen in the waste gas stream.

Figure 2:
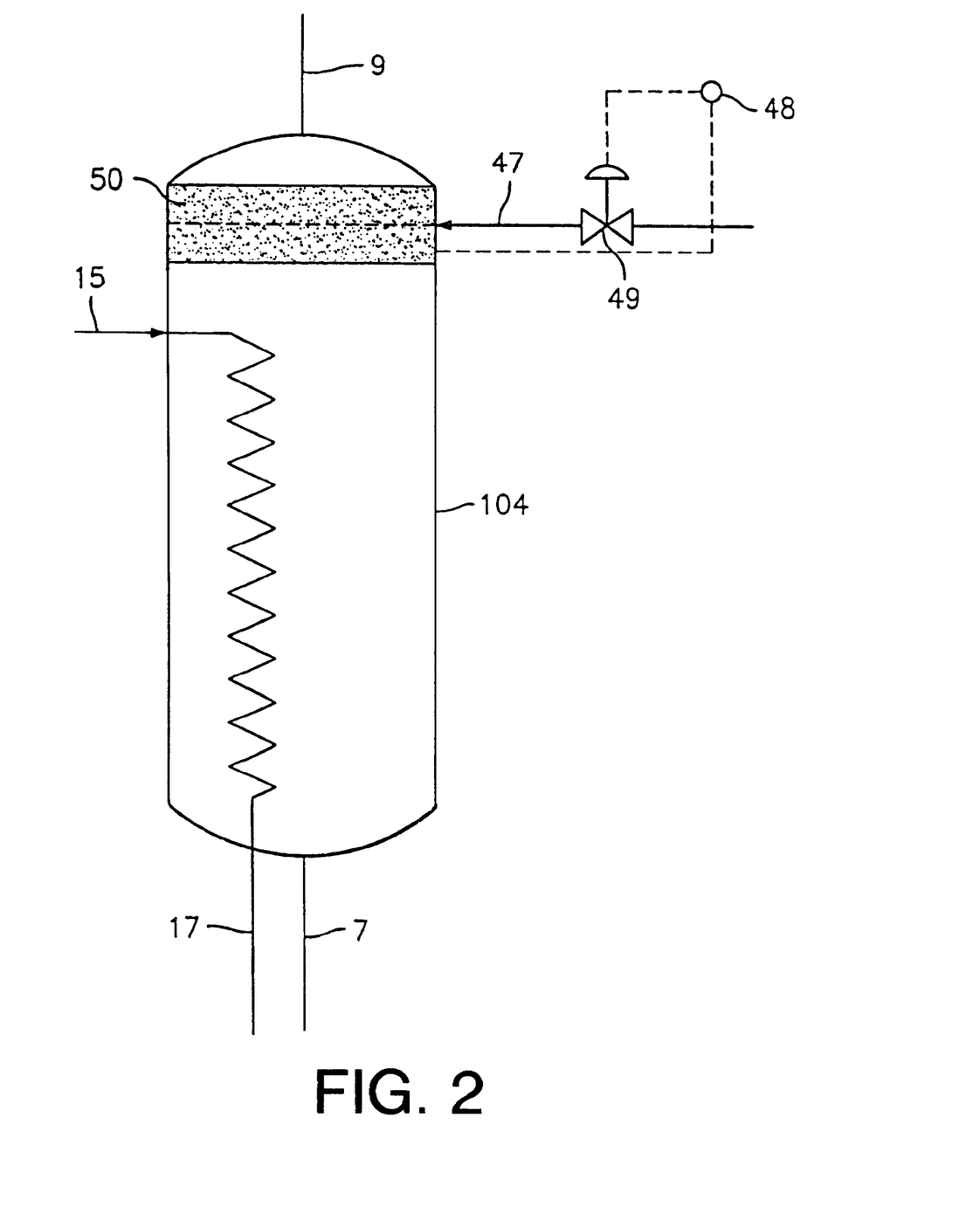
FIG. 2 is directed to a schematic representation of a heating means within a regenerator that could alternatively be used on the present invention.

FIG. 2 shows the integration of the heating means with the regenerator 104. Hot waste nitrogen stream 9 is mixed with a fuel stream 47 as it enters the hot end of regenerator 104. The reaction between the residual oxygen in the waste nitrogen stream 9 and fuel 47 releases energy which raises the temperature of the waste nitrogen. The temperature within regenerator 104 is regulated by adjustment of the flow of fuel by a temperature controller 48 and valve 49. A catalyst bed 50, may be incorporated into the hot end (that portion nearest the entry of stream 9) of the regenerator to promote the reaction of natural gas, or any other fuel, with residual oxygen. A number of fuels would be suitable for this service such as propane, hydrogen, and carbon monoxide or natural gas. The integration of the heating means with the regenerator would be included with both regenerators.

Figure 3:
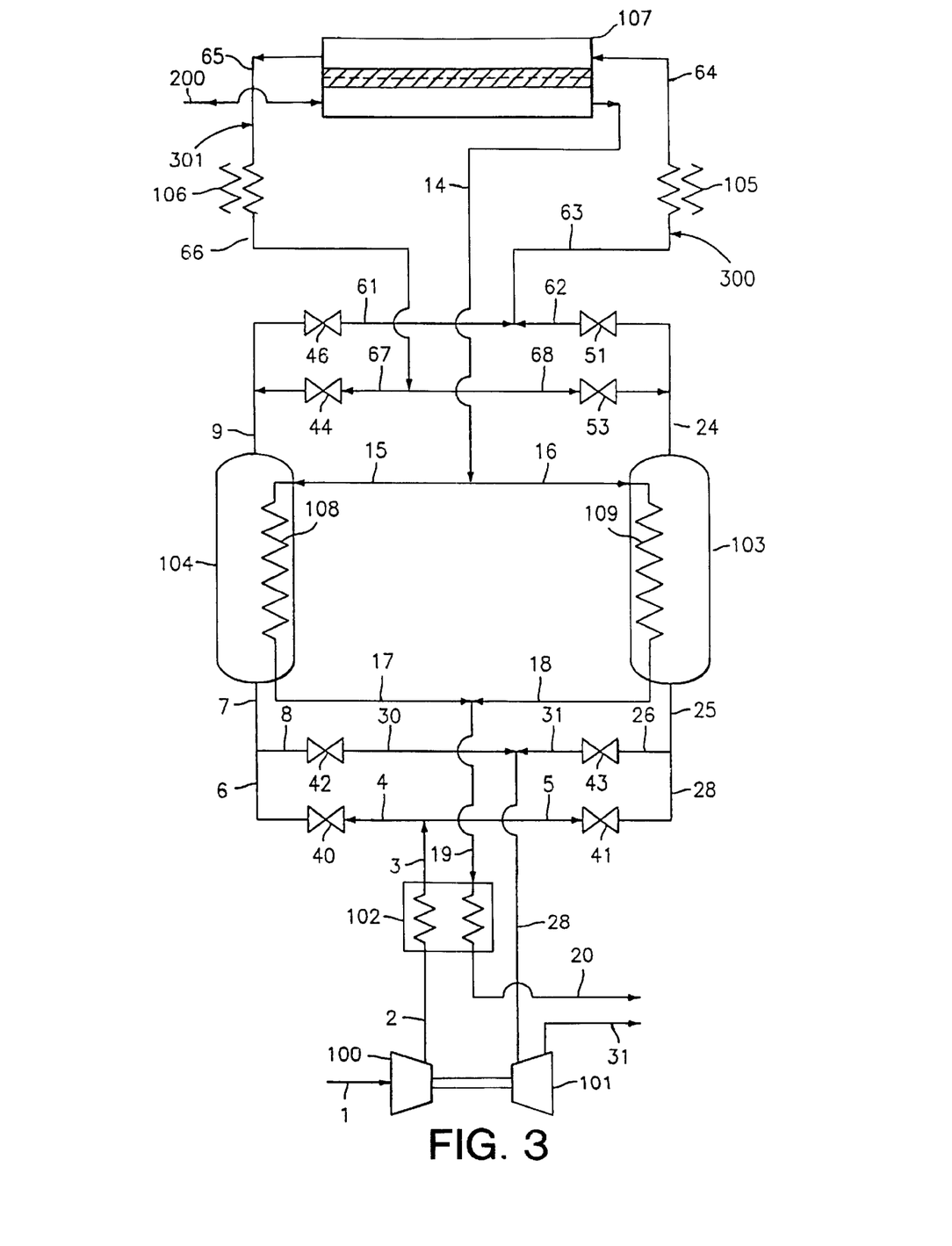
FIG. 3 is directed to a schematic representation of an alternative combined regenerator/mixed conductor ceramic membrane system of the present invention.

The design of the ceramic membrane unit may be such that it is desirable to have the feed air enter at the same location in the membrane. One advantage that this has is that the heaters 105, 106 will see only one type of stream (either air or waste) which simplifies the control. A flowsheet where the feed stream does not reverse as the regenerator cycles is shown in FIG. 3 and discussed below. Note that this flowsheet requires valves that are exposed to hot gas compared to the original flowsheet where there were no hot valves required.

In FIG. 3, warm air stream 3 is obtained in the manner previously described in FIG. 1. Warm air 3 is directed to regenerator 103 via piping 5, 28 and 25 and valve 41. The ballast material within regenerator 103 has previously been heated by passing hot waste nitrogen gas through it in a direction opposite to which the warm air is now flowing. Thus, valve 40 is now closed while valve 41 is open to permit air to flow through regenerator 103. Upon leaving regenerator 103, the hot feed air, 24, flows through valve 51, then through piping 62 and 63 to heating means 105. Heating means 105 raises the temperature of the air stream 64 by about 100° to 200° C. Optionally, the temperature of air stream 64, may be increased by reacting natural gas with the oxygen contained in the air stream in heating means 105 or it may be heated electrically. A fuel stream 300 is shown being added to the air prior to the burner for the case of heating by combustion. The effluent temperature from heating means 105 is monitored and controlled automatically. Hot air stream 64 enters ceramic membrane unit 107 and is separated into high purity oxygen and waste nitrogen.

Hot waste nitrogen exits ceramic membrane unit 107 as stream 65. As before, waste nitrogen stream 65 contains sufficient residual oxygen to support combustion. Upon entering heating means 106, hot waste nitrogen 65 is mixed with a small flow of fuel 301. The fuel reacts with the residual oxygen in the waste nitrogen stream thereby raising the temperature of stream 66 at the exit of heating means 106 above that of stream 65 by about 100° to 200° C. The temperature of stream 66 is automatically controlled. Hot waste nitrogen stream 66 then joins piping 67 and passes through valve 44 before being transferred to piping 9. Valve 53 is closed. Piping 9 then connects to the hot end of regenerator 104. The remainder of the system functions in the same manner as described in FIG. 1.

The valves 44, 46, 51 and 53 and piping 61, 62, 67 and 68, which have been added to FIG. 3, permit directing the hot feed air, line 64, to the same inlet position on the ceramic membrane unit 107 regardless of which regenerator is heating the feed air. Likewise, the waste nitrogen is withdrawn from the same outlet position, line 65, regardless of which regenerator, 103 or 104, is being used to heat the feed air at any particular instant in time. FIG. 3 shows the withdrawal of product oxygen stream 14 from the same ceramic membrane unit outlet position. Stream 14 is divided into two approximately equal volume streams by piping 15 and 16 that flow continuously through coils of pipe contained within regenerators 103 and 104. The regenerator coils are connected to outlet piping 17 and 18 and then combined into a single stream 19 which is cooled to ambient temperature in oxygen heat exchanger 102 before being delivered for consumption in piping 20.

In another embodiment of the present invention, one or more of regenerators may be equipped with a catalyst bed at its hot end. This may be used to promote the reaction of any fuel and any residual oxygen in the waste gas stream. In the examples shown the regenerators are provided with clean product passages, typically coils, for recovering heat from the product streams. Alternatively, a separate heat exchanger could be used to perform this heat exchange, with the regenerators used simply to perform heat exchange on the waste gas. However, it is believed that, due to the high cost of the materials of construction, the incorporation of clean product passages into the regenerator is the most cost-effective approach since it reduces the number of vessels required.

Another addition to the flowsheets shown is when a significant purge stream is required. In this case, the returning hot streams can be used to heat the purge stream, either in separate passages within the regenerator or in a separate heat exchanger.

Finally, the optimum design of the cycle will be site specific since there is the potential to export both power and steam. By operation of this invention at least a portion of the heat exchange between the air and the waste gas is performed within a regenerator.

The present invention is further described in detail by means of the following examples and Comparisons. All parts and percentages are by volume and all temperatures are degrees Celsius unless explicitly stated otherwise.

EXAMPLE

The following table gives details of the streams for an embodiment of the invention to manufacture 250,000 scfh of oxygen (approximately 250 tons per day). The stream numbers refer to FIG. 3. In this example, the waste gas is combusted with a small amount of natural gas. The air stream is not heated between the regenerator and the membrane (flowrate of stream 300 is zero). Also a purge stream is not used (flowrate of stream 200 is zero).

| Stream Number (FIG. 3) | Stream Description | Temperature (° C.) | Pressure (psia) | Flow ($10^3$ scfh) |
| --- | --- | --- | --- | --- |
| 2 | Feed air | 400 | 207 | 1592 |
| 63 | Hot air | 1200 | 204 | 1592 |
| 65 | Hot waste | 1200 | 203 | 1357 |

-continued

| Stream Number (FIG. 3) | Stream Description | Temperature (° C.) | Pressure (psia) | Flow ($10^3$ scfh) |
| --- | --- | --- | --- | --- |
| 301 | Natural gas | 300 | 203 | 15.2 |
| 66 | Very hot waste | 1442 | 202 | 1357 |
| 28 | Cold waste | 692 | 200 | 1357 |
| 31 | Expanded waste | 373 | 15 | 1357 |
| 20 | Cold oxygen | 410 | 20 | 250 |

While the invention has been described above with reference to specific embodiments thereof, it is apparent that many changes, modifications, and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A process for separating a high purity gaseous component from a gaseous mixture, comprising:

passing a feed gas stream containing the gaseous mixture through at least one regenerator to form a heated feed gas stream; and passing at least a portion of the heated feed gas stream through at least one selective ceramic membrane to separate a gaseous component from the gaseous mixture in the heated feed gas stream; thereby forming the high purity gaseous component and a waste gas stream.

2. The process of claim 1 wherein the gaseous mixture is an oxygen-containing gaseous mixture.

3. The process of claim 2 wherein the oxygen-containing gaseous mixture is selected from the group consisting of air, a high purity nitrogen gas stream containing about 0.001% to about 20% by volume oxygen, and a high purity argon gas stream containing about 0.001% to about 20% by volume oxygen.

4. The process of claim 3 wherein the selective ceramic membrane is a mixed conductor ceramic membrane.

5. The process of claim 1 additionally comprising further heating the heated feed gas stream, after having been formed and before being passed through the at least one selective ceramic membrane, by either combusting the heated feed gas stream with fuel, or combining the heated feed gas stream with a heated mono-oxide-hydrogen mixture, or by electrical heating.

6. The process of claim 5 wherein the additional heating is by electrical heating.

7. The process of claim 1 which additionally comprises passing the waste gas component to the regenerator and using thermal energy of the waste gas component to heat the feed gas stream in the regenerator.

8. The process of claim 7 wherein the step of passing the waste gas component through the regenerator and the step of passing the feed gas stream through the regenerator occurs at same pressure.

9. The process of claim 1 wherein the heated feed gas stream is passed through the selective ceramic membrane at a temperature of about 450° C. to about 1200° C.

10. The process of claim 9 wherein the heated feed gas stream is passed through the selective ceramic membrane at a temperature of about 800° C. to about 1000° C.

11. A system for separating a high purity gaseous component from a gaseous mixture, comprising:

a feed gas stream comprising the gaseous mixture;

at least one regenerator capable of heating at least a portion of the feed gas stream, and at least one selective ceramic membrane capable of separating a gaseous component from the gaseous mixture in the heated feed gas stream and thereby forming a high purity gaseous component.

12. The system of claim 11 wherein the gaseous mixture is an oxygen-containing gaseous mixture.

13. The system of claim 12 wherein the oxygen-containing gaseous mixture is selected from the group consisting of air, a high purity nitrogen gas stream containing about 0.001% to about 20% by volume oxygen; and a high purity argon gas stream containing about 0.001% to about 20% by volume oxygen.

14. The system of claim 13 wherein the selective ceramic membrane is a mixed conductor ceramic membrane.

15. The system of claim 11 which additionally comprises a heating means to further heat the heated feed gas stream after that feed gas stream leaves the regenerator.

16. The system of claim 15 wherein the selective ceramic membrane is a mixed conducting membrane formed of a perovskite.

17. The system of claim 11 further comprising a passageway from the selective ceramic membrane to the regenerator whereby a waste gas stream can be transferred from the ceramic membrane to the regenerator.

18. The system of claim 11 wherein the regenerator is essentially isobaric regenerator.

* * * * *